United States Patent [19]

Itoh et al.

[11] 4,151,156
[45] Apr. 24, 1979

[54] MERCAPTO GROUP-CONTAINING SILICONE RUBBER COMPOSITIONS

[75] Inventors: Kunio Itoh; Takeshi Fukuda, both of Annaka, Japan

[73] Assignee: Shin-Etsu Chemical Co., Ltd., Tokyo, Japan

[21] Appl. No.: 925,854

[22] Filed: Jul. 18, 1978

Related U.S. Application Data

[63] Continuation-in-part of Ser. No. 817,506, Jul. 20, 1977, abandoned.

[30] Foreign Application Priority Data

Jul. 22, 1976 [JP] Japan .................................. 51-86542

[51] Int. Cl.² .............................................. C08L 83/08
[52] U.S. Cl. .................................. 260/37 SB; 528/30
[58] Field of Search ................ 260/37 SB; 528/24, 30

[56] References Cited

U.S. PATENT DOCUMENTS

| | | | |
|---|---|---|---|
| 3,341,490 | 9/1967 | Burdick et al. | 260/37 SB |
| 3,382,196 | 5/1968 | Gowdy et al. | 260/46.5 E |
| 3,413,265 | 11/1968 | Bertozzi | 260/46.5 E |
| 4,039,504 | 8/1977 | Homan et al. | 260/37 SB |
| 4,039,505 | 8/1977 | Homan et al. | 260/37 SB |

*Primary Examiner*—Lewis T. Jacobs
*Attorney, Agent, or Firm*—Toren, McGeady and Stanger

[57] ABSTRACT

Mercapto group-containing silicone rubber compositions essentially consisting of a mercapto group-containing organopolysiloxane having a viscosity exceeding 100,000 cSt and represented by the average unit formula

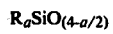

$$R_a SiO_{(4-a/2)}$$

in which R is a monovalent hydrocarbon group substantially free from aliphatic unsaturation, at least two of the R groups in a molecule being mercaptoalkyl groups and a is between 1.98 and 2.05, a certain filler and sulfur, a metal oxide or a metal peroxide as a curing agent. Products from the composition have excellent chemical and mechanical properties and can be bonded to an organic synthetic rubber or natural rubber as well as metals in completely cured state.

6 Claims, No Drawings

MERCAPTO GROUP-CONTAINING SILICONE RUBBER COMPOSITIONS

CROSS REFERENCE TO RELATED APPLICATION

This application is a continuation-in-part application of application Ser. No. 817,506, filed on July 20, 1977, now abandoned.

BACKGROUND OF THE INVENTION

1. Field of the Invention

This invention relates to novel mercapto group-containing silicone rubber compositions.

2. Description of the Prior Art

For purposes of the crosslinking and curing of silicone rubbers, there have been proposed a method in which an organic peroxide is incorporated as a curing agent in a diorganopolysiloxane, the main raw material, and a method in which a platinum compound as a catalyst for addition reaction and an organohydrogenpolysiloxane as a crosslinking agent are incorporated in a vinyl group-containing, high-molecular-weight diorganopolysiloxane. According to these conventional methods, however, it is difficult to satisfactorily cure the silicone composition in which a strong reducing agent is included. Further, according to the conventional methods, the curing of the silicone rubber is insufficient at the areas where the silicone rubber is contacted with a substance having reducing activities or a material containing a reducing agent, or with an organic synthetic rubber of the sulfur vulcanization type, since the synthetic rubber usually contains a sulfur compound, antioxidant, or aging-retarder. Further, the carbon black as a most widely used filler in the organic rubbers may affect the curing of the silicone rubber very badly when the latter is in contact with the former.

With recent development of silicone rubbers, it has become required to prepare laminations of a silicone rubber and an organic synthetic rubber by simultaneous vulcanization and further, for the purpose, to develop new crosslinking and curing methods in a convenient and effective manner.

On the other hand, when the silicone rubber composition to be cured contains unsaturated groups, for example, vinyl groups, of the organopolysiloxane in an amount not lower than 10 mole % based on the total organic groups (for example, the amount is in general between 0.1 and 1 mole %), sulfur-vulcanization is possible. However, the resultant sulfur-vulcanized silicone rubbers having a substantial content of vinyl groups tend to have very poor physical properties, particularly mechanical strengths, and those products can hardly be put to practical use.

SUMMARY OF THE INVENTION

This invention is based, in part, on the discovery that when a mercaptoalkyl group-containing organopolysiloxane is the silicone rubber base, the silicone rubber composition can be cured not only by a conventional method for ordinary silicone rubbers but also by a method using sulfur, a metal oxide or a metal peroxide as a curing agent, and further that the resultant cured silicone rubbers have physical properties, particularly mechanical strengths, comparable or rather superior to those of conventional cured silicone rubbers.

This invention provides a mercapto group-containing silicone rubber composition consisting essentially of (a) 100 parts by weight of a mercapto group-containing organopolysiloxane having a viscosity of at least 100,000 cSt measured at 25° C., said mercapto group-containing organopolysiloxane being represented by the following average unit formula $$R_a SiO_{(4-a/2)} \tag{I}$$

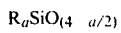

wherein R stands for a substituted or unsubstituted monovalent hydrocarbon group free from aliphatic unsaturation, at least two of groups R in a molecule being mercaptoalkyl groups bonded directly to the silicon atoms, and a is a number in the range from 1.98 to 2.05, (b) from 5 to 200 parts by weight of a filler having a specific surface area of at least 50 m²/g, and (c) from 0.1 to 10 parts by weight of a curing agent selected from the group consisting of sulfur, metal oxides and metal peroxides.

DETAILED DESCRIPTION OF THE PREFERRED EMBODIMENTS

The organopolysiloxane as component (a) useful in the composition of this invention is represented by the above average unit formula (I), and in this formula, R are unsubstituted monovalent hydrocarbon groups, such as methyl, ethyl, propyl, and phenyl groups or the corresponding substituted groups in which some of the hydrogen atoms bonded to the carbon atoms in the hydrogen groups are substituted by halogen atoms, cyano groups, or the like. Further according to this invention, it is essential that at least two of the R groups in a molecule are mercaptoalkyl groups bonded directly to the silicon atoms. If the organopolysiloxane molecule is free of mercaptoalkyl groups or contains only one mercaptoalkyl group, no good curing can be attained, when contacted with a strong reducing agent or a material containing it.

The content of the mercaptoalkyl groups in the organopolysiloxane as component (a) is not particularly critical, but it is preferred that it is from about 0.1 to about 3 mole %, preferably from about 0.1 to about 0.7 mole %, based on the total organic groups bonded to the silicon atoms in the organopolysiloxane. The position where the mercaptoalkyl groups are bonded is not particularly critical, and may be on silicon atoms in the midway of polymer chains or on terminal silicon atoms.

The monovalent hydrocarbon groups represented by the symbol R in the mercaptoalkyl-containing organopolysiloxane must be substantially free from aliphatic unsaturation. In other words, the aliphatically unsaturated groups such as vinyl and allyl groups are undesirable. This is because that the presence of the aliphatically unsaturated groups as the pendant groups of the mercaptoalkyl-containing organopolysiloxane has an adverse effect on some of the mechanical properties such as compression set, especially at high temperatures, and the heat stability, in particular, with poor ultimate elongation after thermal aging of the cured elastomer products formulated with such an organopolysiloxane admixed with a filler and a curing agent.

In accordance with the present invention, it is essential that the organopolysiloxane (a) has a degree of polymerization high enough to correspond to the viscosity of at least 100,000 cSt as measured at 25° C. If it is lower, the resultant cured product tends to have insufficient mechanical strengths.

The mercapto group-containing organopolysiloxane (a) can be prepared by various convenient methods. For example, the organopolysiloxane can be easily produced by a process that involves copolymerizing a hydrolysis product of 3-mercaptopropylmethyldimethoxysilane obtained by the reaction of 3-chloropropylmethyldimethoxysilane and sodium hydrogen sulfide or a hydrolysis product of mercaptopropylmethyldimethoxysilane obtained by the addition reaction of allylmethyldimethoxysilane and hydrogen sulfide, with a hydrolysis product of a chlorosilane, such as dimethyldichlorosilane or methylphenyldichlorosilane in the presence of an acid catalyst, such as Fuller's earth or phosphonitrile chloride. No ordinary alkali catalysts can be used in this copolymerization, since they are readily reactive with mercapto groups.

It is noteworthy that, although small part of the component (a) in the inventive composition may be replaced with an organopolysiloxane containing no mercaptoalkyl groups, the amount of such a mercaptoalkyl-free organopolysiloxane should be limited as small as possible because such a mercaptoalkyl-free organopolysiloxane does not contribute to the crosslink formation by the curing agent but it serves rather as a plasticizer. For example, some of the mechanical properties, especially compression set, are adversely influenced by the use of a blend of a mercaptoalkyl-containing organopolysiloxane and a substantial amount of a mercaptoalkyl-free organopolysiloxane as the component (a).

The filler useful in this invention as component (b) serves to impart reinforcement or sufficient mechanical strengths to the silicone rubber products. For the purpose it is required that its specific surface area should be at least 50 m$^2$/g, preferably from 100 to 300 m$^2$/g, as measured according to the BET method. Illustrative of fillers (b) are silica aerogel and precipitated silica. These silica fillers may be treated in advance with a chlorosilane, such as trimethylchlorosilane or dimethyldichlorosilane, or a silazane, such as hexamethyldisilazane, whereby the surface silanol groups in the silica filler become blocked with organosilyl groups, bringing about improved dispersibility to the filler in the organopolysiloxane matrix.

Illustrative further of fillers (b) of the other type are carbon black and any one of furnace black, channel black, acetylene black, and other carbon black products that may be incorporated in the silicone rubbers when electroconductivity is desired according to use.

It may be added that the use of a filler having basicity is not recommended since the mercaptoalkyl groups are unstable to the action of any alkaline substances.

Further in accordance with this invention, small amounts of aluminum oxide, titanium dioxide, calcium silicate, aluminum silicate, or quartz powder may be added to the above-named silica fillers.

The amounts of component (b) may be determined depending on its kind and the intended use of the silicone rubber products. In general, the amounts vary from 5 to 200 parts by weight per 100 parts by weight of component (a). When the amount of component (b) is smaller that 5 parts by weight per 100 parts by weight of component (a), no sufficient mechanical strengths can be imparted to the silicone rubber products. On the other hand, when it is larger than 200 parts by weight, kneading of component (b) with component (a) becomes extremely difficult, resulting in the formation of unsatisfactory compositions.

The curing agent as the component (c) in the inventive compositions is selected from sulfur, metal oxides and metal peroxides. Organic peroxides, which are the most conventional curing agents in silicone rubber formulations, are not recommended because of rather unsatisfactory bonding of the organic peroxide-formulated silicone rubber to an organic rubber containing various kinds of reducing substances and vulcanized with sulfur although curing of silicone rubbers per se with an organic peroxide is not so unsatisfactory. The metal oxides and metal peroxides suitable for use as a curing agent in the inventive composition are exemplified by $PbO_2$, $ZnO_2$, $CaO_2$, $MgO_2$, ZnO, MgO and CaO. These curing agents may be used singly or in the form of a mixture of two or more of them. The sulfur used as the curing agent in the present invention may be of any grade suitable for use in vulcanizing conventional organic rubbers.

The amount of the component (c) used is from 0.1 to 10 parts by weight per 100 parts by weight of the component (a), variable depending on its kind, desired curing time, and other factors.

The composition of this invention can be obtained by uniformly mixing the foregoing components (a), (b) and (c). It is optional that the composition of the invention is admixed with various additives that are conventionally used in the preparation of ordinary silicone rubbers, including dispersing agents, e.g., hydroxy-terminated low molecular weight organopolysiloxane fluid; heat stability improvers, e.g., ceric oxide and iron oxide; flame retardants, e.g., halogen-containing organic compounds; coloring agents, and the like.

The composition of the present invention may easily be converted to silicone rubber elastomers by heating, if necessary, under pressure. The schedule for the heat treatment depends largely on the kind of the curing agent (c), but it is approximately the same as applied for the curing of any ordinary silicone rubber that is formulated with an organic peroxide as the curing agent.

New to and different from the ordinary unsaturated group-containing organopolysiloxane rubbers for which the curing agent is limited to an organic peroxide or an organohydrogenpolysiloxane in the presence of a platinum catalyst, the mercapto group-containing composition of the present invention can be cured also with sulfur as the curing agent to form adhesive bonding with an organic synthetic rubber or natural rubber formulated with sulfur as the vulcanizing agent by simultaneous vulcanization, thus rendering it possible to develop the field of application of the silicone rubbers.

A carbon black-filled, electrically conductive silicone rubber can not be cured by an acyl peroxide, such as benzoyl peroxide or 2,4-dichlorobenzoyl peroxide, and it has been required to use an alkyl peroxide at a high temperature for the purpose. To contrast, the mercapto group-containing composition of this invention, even if filled with carbon black can be cured without any hindrance at a relatively low temperature in a very short time by use of sulfur on a metal oxide or peroxide as the curing agent.

Furthermore, since the mercaptoalkyl groups present in the component (a) are highly reactive, the composition of the present invention can cure even in contact with natural rubber, an organic synthetic rubber, plastics or a metal, to form a sufficiently strong bond.

Silicone rubber products prepared and shaped from the composition of this invention are used in a wide field, as wire-insulating tubes, packings, gaskets, boots, and the like. Further, by utilizing the adhesive bonding of the silicone rubber of the present invention to the surfaces of an organic synthetic rubber or natural rubber, there can be obtained a variety of silicone rubber-clad articles, such as rubber rolls having improved heat resistance, mold releasability, water repellency and other distinguished properties as are inherent in the silicone rubbers in general.

This invention will be further illustrated by the following examples. In the examples all parts are based on weight.

EXAMPLE 1

An organopolysiloxane mixture composed of 99.48 mole % of octamethylcyclotetrasiloxane, 0.5 mole % of 1,3,5,7-tetra(mercaptopropyl)-1,3,5,7-tetramethylcyclotetrasiloxane, and 0.02 mole % of hexamethyldisiloxane was added with 0.05% by weight of phosphonitrile dichloride. The resultant mixture was reacted in a nitrogen gas atmosphere at 40° to 50° C. for 10 hours to give a polymerizate with gum-like consistency.

The reaction product was a mercapto group-containing organopolysiloxane having a relative viscosity of 2.5 at 25° C. as measured with a 1% solution in toluene. Then, to 100 parts of this mercapto group-containing organopolysiloxane was added 40 parts of a trimethylsilyl-surface blocked silica filler having a specific surface area of 200 m$^2$/g (Silanox 101 manufactured by Cabot Corp.), and uniformly mixed together on a two-roll mill. One of the curing agents indicated in Table I was added in the amount indicated. The resulting compositions were subjected to molding at 170° C. under a pressure of 50 kg/cm$^2$ for 30 minutes to form sheets 2 mm thick. Each sheet thus produced was heated at 200° C. for 4 hours to cure completely. The cured sheets were tested for hardness, elongation and tensile strength in accordance with Japanese Industrial Standard, K 6301, with the results set out in Table I.

Table I

| Curing agent | Amount | Hardness | Elongation | Tensile strength |
|---|---|---|---|---|
| PbO$_2$ | 5 parts | 45 | 650% | 63 kg/cm$^2$ |
| Sulfur | 3 parts | 50 | 520% | 70 kg/cm$^2$ |

EXAMPLE 2

One hundred parts of the mercapto group-containing organopolysiloxane obtained in Example 1 was uniformly mixed on a two-roll mill with 50 parts of a silica filler with the surface blocked by dimethylsiloxane units and having a specific surface area of 100 m$^2$/g (Aerosil 972 manufactured by DEGUSSA) and 1.5 parts of α,ω-dihydroxydimethyl polysiloxane having a viscosity of 20 cSt as measured at 25° C. The resulting composition was called "Compound A."

Separately, another composition was prepared in the same manner as above except that a methylvinylpolysiloxane obtained by polymerizing a mixture consisting of 99.48 mole % of octamethylcyclotetrasiloxane, 0.5 mole % of 1,3,5,7-tetravinyl-1,3,5,7-tetramethylcyclotetrasiloxane and 0.02 mole % of hexamethyldisiloxane in the presence of potassium hydroxide at 150° C. for 6 hours was used instead of the mercapto group-containing organopolysiloxane. This composition was called "Compound B."

Then, 3 parts of sulfur was added to 100 parts of Compound A, while 4 parts of dicumyl peroxide was added to 100 parts of Compound B. From each of these two mixtures, a 1-mm thick sheet was formed in uncured state.

Each uncured sheet was put on a 2-mm thick uncured silica-filled EPDM rubber sheet containing 1.5% by weight of sulfur, followed by heating at 170° C. under a pressure of 50 kg/cm$^2$ for 35 minutes, to form a lamination.

The sheet from Compound A was found completely cured even at the areas in contact with the EPDM rubber sheet, with a bonding strength of 15 kg/cm as determined by the peeling test. On the other hand, the sheet from Compound B was found insufficiently cured and remaining in sticky state at the areas in contact with the EPDM rubber sheet.

EXAMPLE 3

Three mixtures were prepared each by adding 45 parts of acetylene black (Denka Black manufactured by Denki Chemical Co., Ltd.) to 100 parts of the mercapto group-containing organopolysiloxane obtained in Example 1. To each mixture dicumyl peroxide, sulfur, or ZnO$_2$ was added in amounts of 2, 1.5 and 4 parts, respectively. The resultant three compositions were called "Compounds C, D, and E," respectively.

Separately, another composition was prepared by adding to 100 parts of the methylvinylpolysiloxane obtained in Example 2 and mixed with 45 parts of the same acetylene black, 1.5 parts of methylhydrogenpolysiloxane (KF 99 manufactured by Shin-Etsu Chemical Co., Ltd.), and 0.1 part of a solution of chloroplatinic acid in isopropyl alcohol in a concentration of 2% by weight as platinum. The composition was called "Compound F."

Each of Compounds C, D, E and F was spread over the surface of a 1-mm thick sulfur-cured natural rubber sheet, to form a layer 1 mm-thick, followed by heating at 165° C. under a pressure of 100 kg/cm$^2$ for 30 minutes, to form a lamination.

The layers from Compounds C, D and E were found cured and bonded to the natural rubber sheet with adhesive strengths of 3, 6 and 4 kg/cm, respectively, as determined by the peeling test. On the other hand, the layer from Compound F wholly was found uncured or semi-cured, the uncured or semi-cured state remaining unchanged even with continued heating under pressure for another 30 minutes.

EXAMPLE 4

A mercapto group-containing organopolysiloxane composed of 5 mole % of diphenylsiloxane units, 0.3 mole % of 3-mercaptopropylmethylsiloxane units, 94.68 mole % of dimethylsiloxane units and 0.02 mole % of trimethylsiloxane units was prepared in the same manner as described in Example 1. Then, to 100 parts of the mercapto group-containing organopolysiloxane were added 45 parts of a fumed silica (Tullanox 500 manufactured by Tulco Co.) and 3 parts of sulfur, and uniformly mixed together on a 2-roll mill.

The resulting composition was heated at 170° C. under a pressure of 100 kg/cm$^2$ for 30 minutes, to form a sheet 2 mm thick. The sheet was then cured by heating at 150° C. for 4 hours. The cured sheet was tested for hardness, elongation, tensile strength, tear strength, and elastic resilience in accordance with Japanese Industrial Standard, K 6301. The results are shown below.

Hardness: 45
Elongation: 750%

Tensile strength: 80 kg/cm$^2$
Tear Strength: 18 kg/cm
Elastic resilience: 45%

The above composition that had not been subjected to curing was spread over the surface of a carbon black-filled and uncured ethylene-propylene terpolymer rubber containing a binary curing agent of 0.3% by weight of sulfur and 3% by weight of dicumyl peroxide (both based on the weight of the terpolymer), followed by heating at 170° C. under a pressure of 50 kg/cm$^2$ for 45 minutes, to form a lamination. As a result, the lamination was found completely cured into an integrated product.

Separately an organopolysiloxane was prepared in the same manner as described above except that the 3-mercaptopropylmethylsiloxane units were substituted by methylvinylsiloxane units. Then, 100 parts of the organopolysiloxane was uniformly mixed with 45 parts of the same fumed silica as used above (Tullanox 500) and 3 parts of dicumyl peroxide (C-3 manufactured by Shin-Etsu Chemical Co., Ltd.). The resulting mixture was spread over the surface of the same ethylene-propylene terpolymer rubber sheet, followed by a heat treatment. As a result, the combination of the two sheets remained uncured at the contacting areas, and the sheets were readily peeled from each other.

EXAMPLE 5

Five kinds of organopolysiloxanes with gum-like consistency composed of dimethylsiloxane units, mercaptopropylmethyl or methylvinylsiloxane units and trimethylsiloxy units were prepared in the same manner as in Example 1 with the molar ratios of the individual siloxane or siloxy units as indicated in Table II (Organopolysiloxanes 5-1 to 5-5).

Table II

| Organopolysiloxane | 5-1 | 5-2 | 5-3 | 5-4 | 5-5 |
|---|---|---|---|---|---|
| Dimethylsiloxane units, mole % | 99.48 | 99.48 | 98.98 | 99.38 | 98.98 |
| Mercaptopropylmethylsiloxane units, mole % | 0.50 | — | 0.50 | 0.10 | 1.00 |
| Methylvinylsiloxane unit, mole % | — | 0.50 | 0.50 | 0.50 | — |
| Trimethylsiloxy unit, mole % | 0.02 | 0.02 | 0.02 | 0.02 | 0.02 |

Silicone rubber compositions were prepared by blending 100 parts each of the above organopolysiloxanes, 40 parts of a fumed silica with surfaces blocked with trimethylsilyl groups having a specific surface area of 200 m$^2$/g and a curing agent as indicated in Table III below and and each of the compositions was fabricated into a sheet 2 mm thick and cured similarly to Example 1. The mechanical properties of these cured silicone rubber sheets are given in Table III.

Table III

| Organopolysiloxane | 5-1 | 5-1 | 5-1 | 5-2$^{a)}$ | 5-2 | 5-2$^{(a)}$ | 5-3 | 5-4 | 5-5 |
|---|---|---|---|---|---|---|---|---|---|
| Curing agent (parts) | | | | | | | | | |
| Sulfur | 3 | — | — | 3 | — | — | — | — | — |
| Dicumyl peroxide | — | 1.5 | — | — | 1.5 | — | — | — | — |
| ZnO$_2$ | — | — | 5 | — | — | 5 | 5 | 5 | 5 |
| Hardness (JIS) | 48 | 49 | 46 | — | 56 | — | 48 | 21 | 64 |
| Ultimate elongation, % | 570 | 560 | 590 | — | 410 | — | 510 | 780 | 400 |
| Tensile strength, kg/cm$^2$ | 70 | 72 | 66 | — | 80 | — | 64 | 20 | 70 |
| Elastic resilience, % | 50 | 54 | 47 | — | 60 | — | 49 | 20 | 62 |

$^{(a)}$Not cured at all.

EXAMPLE 6

A silicone rubber composition was prepared by uniformly blending on a two-roll mill 100 parts of a mercapto group-containing organopolysiloxane with gum-like consistency composed of 99.65 mole % of dimethylsiloxane units and 0.35 mole % of mercaptopropylmethylsiloxane units, 50 parts of precipitated silica filler (Nipsil VN$_3$, product of Nippon Silica Co., Japan), 5 parts of zinc oxide and 5 parts of the same α,ω-dihydroxydimethylpolysiloxane fluid as used in Example 2 followed by admixture of 2 parts of sulfur as the curing agent. (Composition 6-1).

For comparative purpose, the amount of the mercapto group-containing organopolysiloxane gum was decreased to 50 parts or 70 parts and, instead, 50 parts or 30 parts of a methylvinylpolysiloxane with gum-like consistency composed of 99.65 mole % of dimethylsiloxane units and 0.35 mole % was admixed with the other ingredients being admixed in the same amounts as above (Compositions 6-2 and 6-3).

Each of the above compositions was fabricated into a sheet 2 mm thick by press-curing at 160° C. for 20 minutes under a pressure of 50 kg/cm$^2$ followed by heating at 150° C. for 2 hours to complete the curing. The mechanical properties of these silicone rubber sheets are given in Table IV below.

Table IV

| Composition | 6-1 | 6-2 | 6-3 |
|---|---|---|---|
| Hardness (JIS) | 50 | 30 | 35 |
| Ultimate elongation, % | 370 | 280 | 310 |
| Tensile strength, kg/cm$^2$ | 68 | 37 | 43 |
| Compression set, % | 40 | 90 | 77 |

The values of the compression set were determined in acordance with the procedure specified in JIS K 6301.

EXAMPLE 7

Three kinds of organopolysiloxane with gum-like consistency (7-1), (7-2) and (7-3) were prepared which were composed of 99.40 mole % of dimethylsiloxane units and 0.60 mole % of mercaptopropylmethylsiloxane units; 99.40 mole % of dimethylsiloxane units and 0.40 mole % of methylvinylsiloxane units; or 99.40 mole % of dimethylsiloxane units, 0.30 mole % of mercaptopropylmethylsiloxane units and 0.30 mole % of methylvinylsiloxane units, respectively.

One hundred parts of the organopolysiloxane (7-1), 50 parts each of the organopolysiloxanes (7-1) and (7-2), or 100 parts of the organopolysiloxane (7-3) was blended with 40 parts of a silica filler Tullanox 500 (see Example 4), 10 parts of an acetylene black, 1 part of diphenylsilane diol, 3 parts of zinc oxide (ZnO) and 2.3 parts of sulfur to give silicone rubber compositions, which were then shaped into rubber sheets 2 mm thick by press-curing at 160° C. for 20 minutes under a pressure of 50 kg/cm$^2$. The mechanical properties of these cured rubber sheets are given in Table V below.

Further two aluminum or steel plates of 25 mm width were adhesively bonded with each of the above prepared silicone rubber composition with the length of overlapping 10 mm with application of Primer A-10 (product of Shin-Etsu Chemical Co.) on the plate surfaces. After curing at 160° C. for 20 minutes under a pressure of 30 kg/cm², the shearing adhesive strength of these bonded plates was examined to give the results as given in Table V.

In comparison, three comparative compositions were prepared by replacing 2.3 parts of sulfur with 3 parts each of dicumyl peroxide and similar tests for shearing adhesive strength were undertaken to give the results given in the same table.

Table V

| (parts) Organopolysiloxane (parts) | (7-1) (100) | (7-1) (50) +(7-2) (50) | (7-3)(100) |
|---|---|---|---|
| Hardness (JIS) | 57 | 35 | 44 |
| Ultimate elongation, % | 457 | 335 | 410 |
| Tensile strength, kg/cm² | 75 | 35 | 44 |
| Compression set, % | 35 | 76 | 58 |
| Shearing adhesion, kg/cm²: | | | |
| Sulfur-cured aluminum | 23 | 5.7 | 18 |
| Sulfur-cured steel | 26 | 9.4 | 14 |
| Peroxide-cured aluminum | 19 | 0 | 12 |
| Peroxide-cured steel | 20 | 5.3 | 9 |

What is claimed is:

1. A mercapto group-containing silicone rubber composition consisting essentially of
   (a) 100 parts by weight of a mercapto group-containing organopolysiloxane having a viscosity at least 100,000 centistokes measured at 25° C., said mercapto group-containing organopolysiloxane being represented by the following average unit formula $$R_a SiO_{(4-a/2)}$$

wherein R stands for a substituted or unsubstituted monovalent hydrocarbon group substantially free from aliphatic unsaturation, at least two of groups R in a molecule being mercaptoalkyl groups bonded directly to the silicon atoms, and a is a number in the range from 1.98 to 2.05,
   (b) from 5 to 200 parts by weight of a filler having a specific surface area of at least 50 m²/g, and
   (c) from 0.1 to 10 parts by weight of a curing agent selected from the group consisting of sulfur, metal oxides and metal peroxides.

2. The mercapto group-containing silicone rubber composition as claimed in claim 1 wherein the content of the mercaptoalkyl groups in component (a) is from 0.1 to 0.7 mole % based on the total organic groups bonded to the silicon atoms in component (a).

3. The mercapto group-containing silicone rubber composition as claimed in claim 1 wherein the specific surface area of component (b) is from 100 to 300 m²/g.

4. The mercapto group-containing silicone rubber composition as claimed in claim 1 wherein component (b) is selected from the group consisting of a silica filler and a carbon black.

5. The mercapto group-containing silicone rubber composition as claimed in claim 1 wherein component (c) is sulfur.

6. The mercapto group-containing silicone rubber composition as claimed in claim 1 wherein component (c) is a metal oxide or a metal peroxide.

* * * * *